Figure 1:
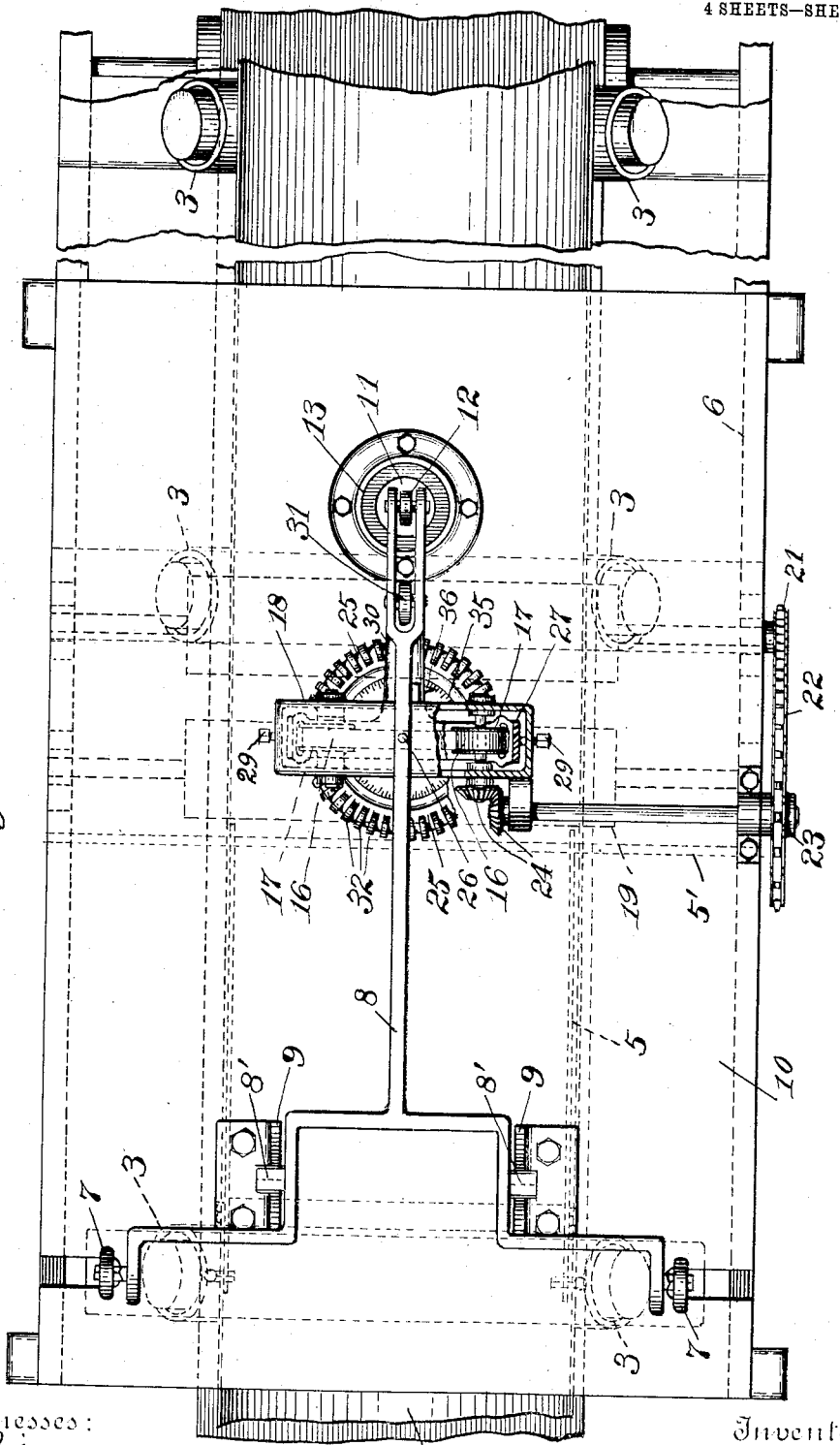

H. L. MERRICK.
INTEGRATING DEVICE.
APPLICATION FILED NOV. 25, 1907.

954,870.

Patented Apr. 12, 1910.
4 SHEETS—SHEET 1.

Witnesses:

Inventor,
Herbert L. Merrick,
By his Attorney,

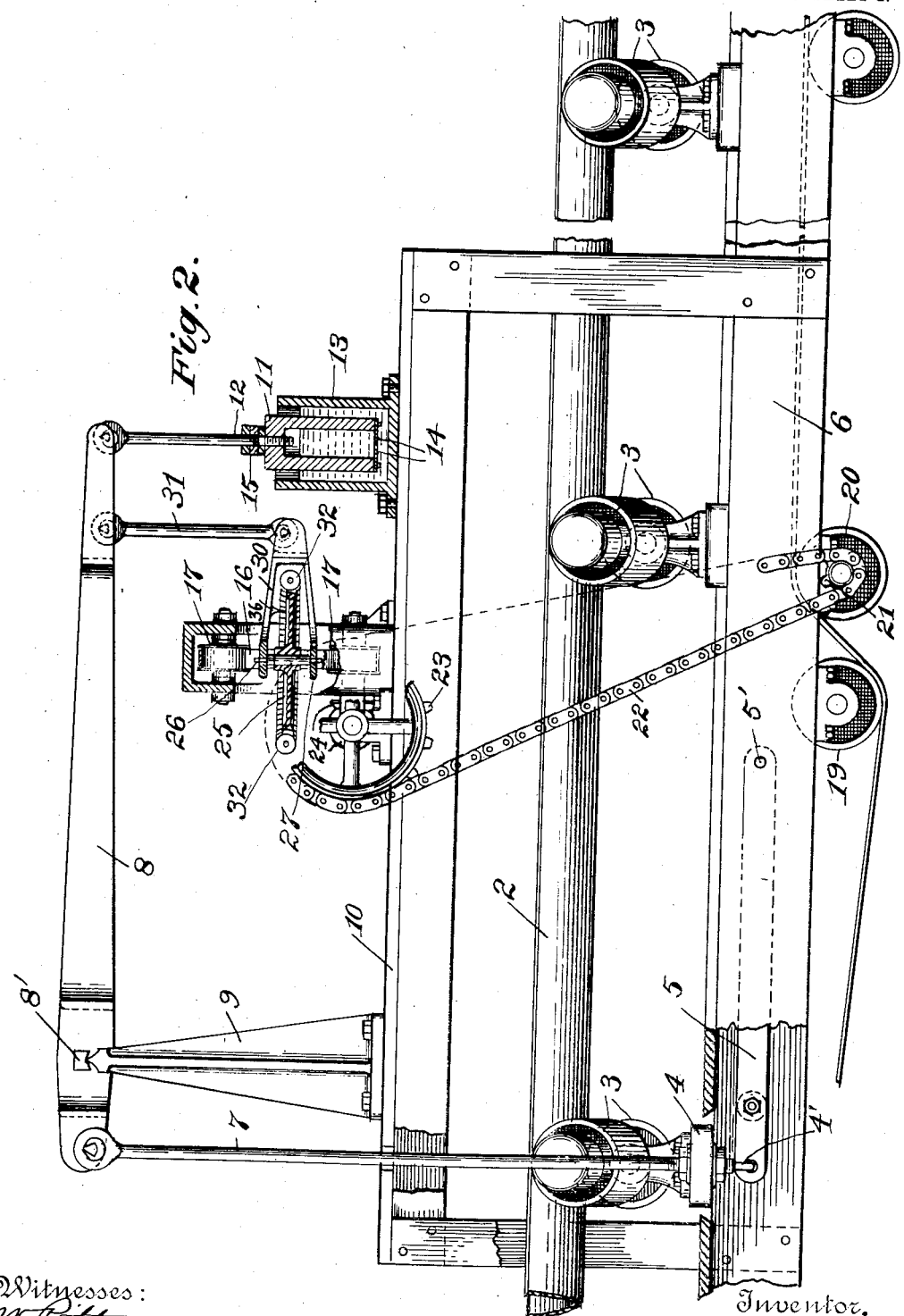

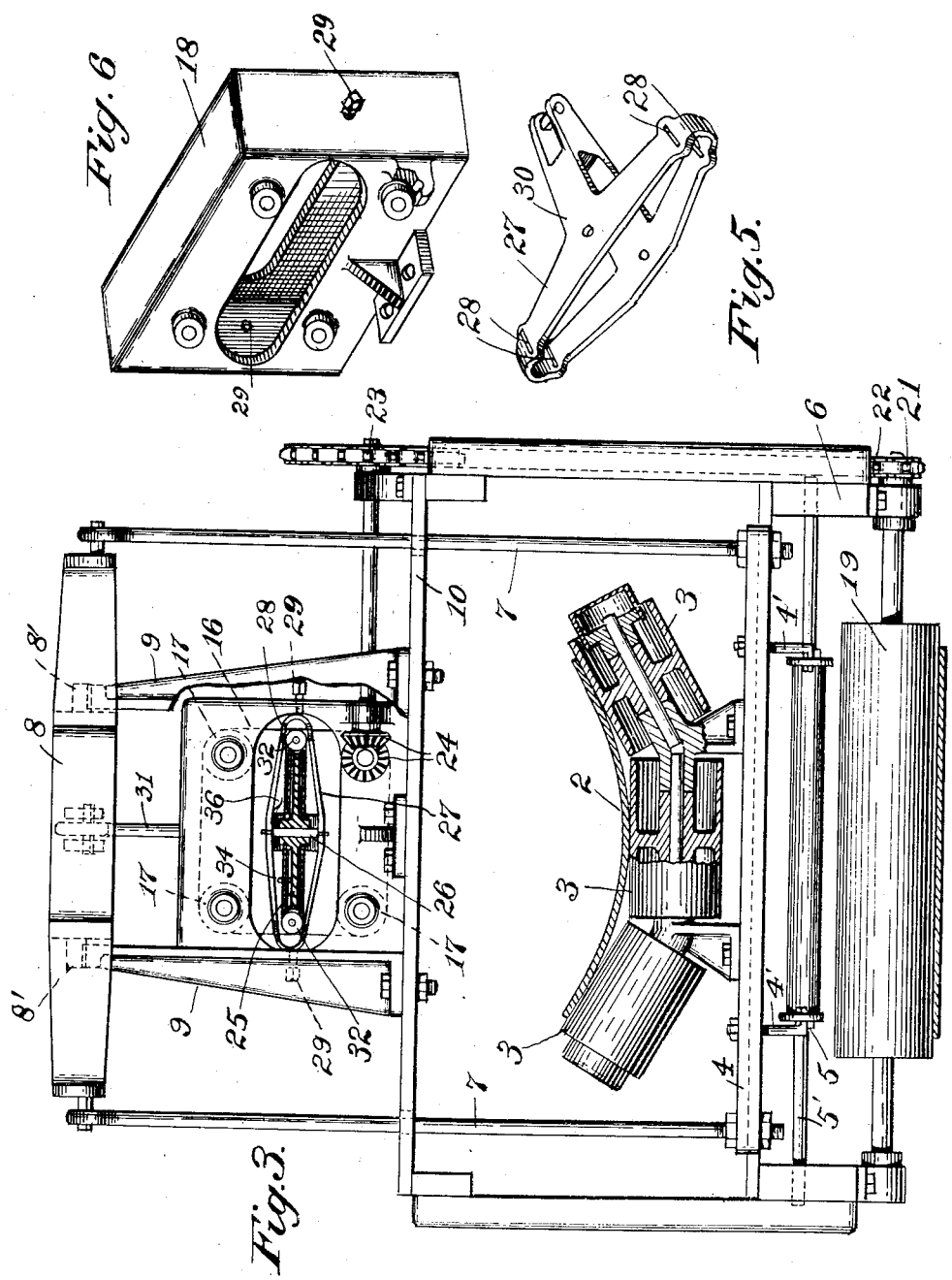

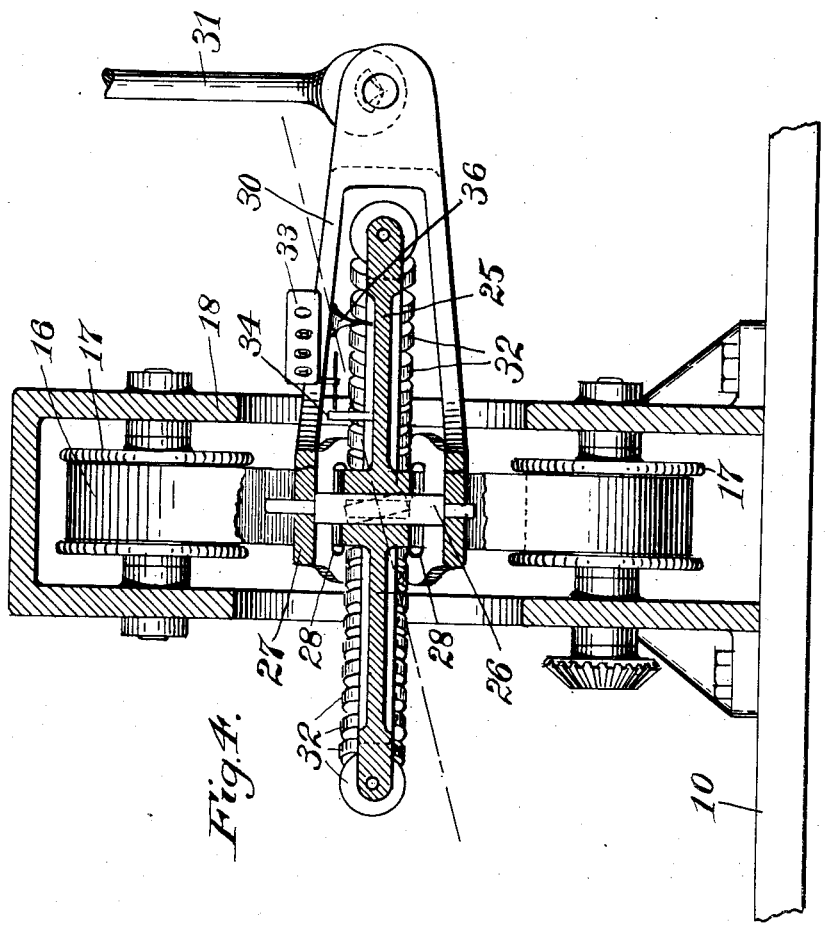

UNITED STATES PATENT OFFICE.

HERBERT L. MERRICK, OF PASSAIC, NEW JERSEY.

INTEGRATING DEVICE.

954,870.

Specification of Letters Patent.   Patented Apr. 12, 1910.

Application filed November 25, 1907. Serial No. 403,643.

*To all whom it may concern:*

Be it known that I, HERBERT L. MERRICK, of Passaic, New Jersey, have invented a certain new and useful Improvement in Integrating Devices, of which the following is a specification.

In my application, Ser. No. 352,491, filed January 16, 1907, there is shown, described and claimed, a device for integrating a quantity which is a function of two other quantities, represented, specifically, in the illustrated embodiment of that invention by rate of linear conveyer belt travel and the load on and in course of transportation by the belt. The integrating or planimeter wheel rests upon the surface of an element moving in unison with the belt and the angle of its plane of rotation to the line of travel of such element is under the control of a weighing beam connected to a weighing platform over which the belt runs while the force component (in general variable due to a variable belt loading) normal to the plane of the wheel and due to the frictional effort between the wheel and the said element is utilized to move the former axially. The extent of this axial movement serves to indicate the result of the integration, and to register the same by proper means, or in other words, in that specific embodiment, the load conveyed. The integrating wheel is movable transversely across the belt in that invention and means are set forth for reversing the direction of axial movement at each extremity thereof, a counter for registering the number of such reversals being comprised in the registering, weight-indicating mechanism. The present invention contemplates a mechanical integrator construction for rendering the integrating or axial motion of the said integrating wheel a continuous one in the sense of such motion being always in the same direction, thus avoiding the necessity for reversal of motion and consequent constructive complication and liability to the introduction of sources of error in operation as well as added cost. This result I attain by mounting a plurality or series of integrating or planimeter wheels on a carrier so related to the traveling surface that the aforesaid axial movement serves to give a continuous one direction movement to the carrier so long as the traveling friction surface is in motion.

The various features of the invention are illustrated in the drawings attached to the present specification as embodied in an automatic weigher and in these drawings Figure 1 is a plan view thereof, parts being broken away to show underlying parts. Fig. 2 is a side elevation, certain parts being broken away and certain other parts being in section. Fig. 3 is mainly an end elevation, partly a cross section. Fig. 4 is an enlarged section showing the assembled carrier and integrating wheels, certain associated parts and also indicating in a general way the change in relationship caused by the fluctuation of the weighing beam. Fig. 5 is a perspective view of the pivotally mounted supporting frame. Fig. 6 is a similar view of the housing for said frame.

Similar characters of reference designate corresponding parts in all figures.

The mechanical integrator constituting the subject matter of the present invention is applicable generally to the measurement of a magnitude which is a function of two quantities either one or both of which may be variable. This integrator is susceptible of continuous operation by mechanical means to yield an integrated result as aforesaid in a wide variety of uses and environments. However, for the sake of a clear explication of its features it is shown herein as embodied in an apparatus for the continuous weighing of material brought to the weighing point by a conveying belt 2 whose upper or carrying stretch is supported on trough-forming rolls 3 in any desired and appropriate manner. At a convenient point past which the belt travels (herein designated as the weighing point) the load on the belt is caused to influence a steelyard weighing beam or weighing scale. Such a part is generic of one of the important features of the present integrator and which as thus specifically illustrated may be generically described as a part having a character of movement which is truly representative of or responsive to the variations in one of the quantities of which the integrated result is a function, that is to say specifically in this instance, the load passing the weighing point.

The construction here adopted comprises a platform 4 carrying a set of trough-forming belt-supporting rolls 3 and joined by connecting rods 4' with a guiding frame 5 fulcrumed by a rod 5' to the frame work 6 of the apparatus. Platform 4 is hung by side links 7 from one end of a steelyard or beam 8. Points of suspension may of course be knife edges when desired while the beam is fulcrumed intermediate its ends by a similar device, see 8', to standards 9 erected upon a supplemental frame work 10. It is evident from this construction that the turning of weighing beam 8 about its fulcrum is under the direct control of the loaded conveyer passing over the weighing platform and in order to offset the weight of the load on the conveyer some suitable form of resistance is connected to steelyard 8. The one illustrated comprises a combined mercury float and dash pot consisting of a hollow cylinder 11 suspended by a link 12 from the end of beam 8 and dipping into a mass of mercury in an open vessel 13 on frame 10. This float so acts as to permit a constantly increasing movement of the beam from its normal or no load position for constantly increasing loads on the suspended portion of the conveyer. To prevent too rapid vibration of the beam, the bottom of float 11 is closed and small openings 14 throttle the passage of mercury and air tending only to retard the action without affecting the accurate movement of the float. Adjustable weights 15 balance the static load so that the system assumes its normal or zero position when there is no load passing the weighing point.

Other essential features of the present integrator consist of a traveling surface whose motion is a function of the motion of the conveying belt, and a planimeter or integrating wheel to roll or rotate in contact with such surface. The rate of travel of such surface is generic of one of the functional quantities of the integration, manifestly in the illustrated embodiment the rate of travel of the conveying belt. While any particular absolute ratio of travel between the conveyer and said surface is not essential, it is of course important that any change of fluctuation in the speed of the conveyer should be accompanied by a corresponding change in the speed of said surface, that is to say, the two should move in synchronism. In this instance the traveling surface consists of an endless belt 16 running over rolls 17 supported by a housing 18 on the supplemental frame 10. These rolls 17 are preferably so related that they establish two substantially parallel stretches, here the two vertical stretches, for a purpose that will presently appear.

To fulfil the before mentioned requirement of synchronous movement, belt 16 is driven from the conveyer belt, the lower stretch of the latter belt running under a deflecting roll 19 and over a driven roll 20, a sprocket wheel 21 on the shaft of which latter is connected by chain 22 with a sprocket wheel 23 driving through gears 24 one of the rolls 17.

In my application hereinbefore referred to there is disclosed an integrating wheel whose periphery bears against the surface of a belt moving in synchronism with the conveyer and which is shiftable from a zero position (corresponding to no load on the moving conveyer) in which the plane of rotation of the wheel is in parallelism with the line of travel of the belt into an angular relation of said plane and line of travel under the influence of the movement of the weighing beam. The integrating wheel therein is free to rotate about its own axis while the component of frictional effort normal to the plane of rotation of the wheel instead of causing the belt and wheel to relatively slip results in an axial movement of the wheel. Provision is further made in that device for reversing such axial movement when the wheel approaches each side of the belt and the registering of the reversals serves to indicate the result of the integration, or the load transported in a given time. In the present invention the necessity of such reversals with any attendant source of objection is avoided by so mounting the planimeter wheel that it is brought into action, is then caused to integrate axially transversly of the belt as before, and is thereupon carried to the point where it again passes onto the belt and into action by a motion which is continuous in the sense that it is always in the same direction. Moreover, in order not to interfere with the continuity of the integrating action means are provided for bringing a succession of integrating wheels successively into operative position with relation to the belt, an integrating wheel being in an integrating position at the time of the passage of any integrating wheel out of such position. Such a result I attain by mounting a series of integrating wheels on a carrier in such a relation that in the zero, or non-integrating (no load) position, the integrating wheel in contact with the friction belt merely rotates on its axis and there is no force component normal to the plane of rotation of the wheel. When, however, an angular relation is brought about under the influence of the part here represented by the loaded weighing beam, a force component is established which tends to turn the aforesaid carrier.

As here constructed the carrier is a rotary disk 25 whose shaft 26 is mounted in a frame 27 which diametrally encircles the disk and is slotted at 28 for the passage of the two stretches of belt 16. Frame 27 is pivotally mounted in a housing 27', see pivot pins 29, to turn about an axis which intersects, at least approximately, the axis of rotation of the disk and is perpendicular thereto. An arm-like extension 30 of frame 27 is hung from beam 8 by a suspension link 31. The construction is thus such that frame 27 may swing in a plane parallel to the surface planes of the aforesaid parallel stretches of belt 16.

Around the periphery of disk 25 is disposed a series of rolls 32 all independently rotatable about an axis extending circumferentially of the disk and the plane of which is perpendicular to the rotative axis of the disk. Each of the rolls 32 constitutes an integrating wheel, the particular roll in contact with the moving belt 16 merely rotating about its axis in the no load position of the apparatus without any tendency existing to rotate disk 25. When, however, through the movement of the weighing beam, the angular relation is changed, the force component perpendicular to the plane of rotation of each integrating wheel 32 and tangential to disk 25 produces an angular motion of the latter and a bodily motion of the wheel across the surface of the belt, the following wheels successively coming into action in orderly procession. The rotation of disk 25 is thus continuous as long as a load is being transported by the conveyer. I prefer to have the wheels at diametrally opposite sides of the disk contact with the two parallel oppositely moving stretches of belt 16 in order to decrease side thrust and accentuate the tendency to rotate the disk uniformly and to minimize the tendency of the frictional resistance to rotation of the disk to cause slipping; belt 16 is therefore caused to press against the wheels at opposite sides of the disk with the desired and appropriate pressure. Each integrating wheel 32 is also preferably somewhat tapering toward each end so that the outline of all the wheels coincide with the circumscribing circumference of the assembled disk and wheels in plan view.

Assuming a given speed of belt 16, the angular velocity of disk 25 will manifestly increase with an increased load passing the weighing point (or increase in value of one of the functional quantities) and vice versa. The rotations of the disk and hence the result of integration (weight conveyed) may be indicated by an instrument in the nature of a counter 33 actuated by a pin 34 carried by the disk. If it is desired, moreover, that the result of integration (weight conveyed) between the times of successive actuations of the counter should be ascertainable, a properly juxtaposed scale 35 and pointer 36 may be provided.

Obviously anti-friction bearings may be used wherever they are found practicable and it is desirable to decrease the frictional resistance with consequent increase of sensitiveness.

In one sense, carrier or disk 25 may be regarded as an integrating or planimeter wheel while rolls 32 constitute anti-friction devices on its periphery for eliminating slipping between the disk and the belt and hence in using the term carrier without the mechanical qualification of a peripheral roll mounting I mean thereby an integrating wheel bearing directly on the moving surface and not thereon through the medium of interposed rolls.

Having described my invention, I claim:—

1. An integrating device comprising, in combination, a carrier provided with integrating wheels, a traveling element whose surface is adapted to frictionally actuate said wheels in succession; the plane of movement of the carrier being normal to the line of travel of said surface when the magnitude of one of the functional quantities is zero, and means for varying the angle between said line of travel and said plane with changes in the value of said functional quantity.

2. An integrating device comprising, in combination, a rotary carrier provided with integrating wheels, a traveling element whose surface is adapted to frictionally rotate said wheels and thereby said carrier, said carrier having a zero position in which its plane of rotation is normal to the line of travel of the belt, means for varying the angle between said line of travel and said plane with varying values of one of the functional quantities, and means for registering the rotations of said carrier.

3. An integrating device comprising, in combination, a rotary carrier provided with integrating wheels, a traveling belt having oppositely moving parts or stretches each adapted to frictionally rotate said wheels, and means for varying the angle between the line of travel of said belt and the plane of rotation of the carrier.

4. In an integrating device, the combination of a traveling element, a rotary carrier provided with integrating wheels which are adapted to be frictionally actuated by the surface of said element and whose axis is mounted to swing in a plane parallel to the line of travel of said element from a zero position in which the plane of rotation of the carrier is normal to the line of travel of the element, and means responsive to changes in one of the functional quantities connected with said carrier for swinging the same as aforesaid.

5. In an integrating device, the combination of a traveling element whose rate of travel is adapted to vary as specified and having a frictional surface, a rotary carrier, an integrating wheel thereon in frictional engagement with said surface, said carrier being mounted to swing in a plane parallel to the line of travel of said element from a zero position in which the plane of rotation of the carrier is normal to the line of travel of said surface means connected with said carrier for swinging the same as aforesaid, and means for registering the rotations of said carrier.

6. In an integrating device, the combination of a traveling element whose rate of travel is adapted to vary as specified and having a friction surface, a rotary carrier, a series of integrating wheels on the carrier adapted to successively frictionally engage with said friction surface, means embodying a mounting for said carrier adapting the carrier to turn in a plane parallel to said friction surface of said element, and mechanism for registering the rotation of the carrier.

7. In an integrating device, the combination of a traveling belt whose rate of travel is adapted to vary as specified and having two substantially parallel oppositely moving lengths, a rotary carrier, a series of integrating wheels on the carrier, said wheel-carrying carrier being located between and the wheels thereon being in frictional engagement with said parallel oppositely-moving parts of said traveling belt, means embodying a mounting for said carrier adapting the same to turn in a plane parallel to the friction surfaces of said belt lengths, and mechanism for registering the rotations of the carrier.

In testimony whereof I have signed my name to the specification in the presence of two subscribing witnesses.

HERBERT L. MERRICK.

Witnesses:
PIERSON L. WELLS,
HENRY LEVIS.